United States Patent [19]

Wachter et al.

[11] 4,096,793
[45] Jun. 27, 1978

[54] APPARATUS FOR COOLING HOPS

[75] Inventors: Rudolf Ludwig Wachter; Winfried Franz Edinger, both of Au, Hallertau, Germany

[73] Assignee: Firma Permahop Hopfenpulver GmbH & Co. KG, Germany

[21] Appl. No.: 670,289

[22] Filed: Mar. 25, 1976

[30] Foreign Application Priority Data

Mar. 27, 1975 Germany .................... 2513884

[51] Int. Cl.² .................... A23L 3/36; B60H 3/04
[52] U.S. Cl. .................... 99/467; 34/217; 99/473; 99/477; 198/525; 426/444
[58] Field of Search .................... 99/467–482; 34/217, 236; 198/525, 526, 562, 565; 426/444; 259/25, 154

[56] References Cited

U.S. PATENT DOCUMENTS

| 37,869 | 3/1863 | Krausch | 99/469 X |
|---|---|---|---|
| 887,628 | 5/1908 | Hall | 99/469 |
| 1,033,199 | 7/1912 | Schaefer | 259/25 |
| 1,646,582 | 10/1927 | Halliburton | 259/154 X |
| 2,622,345 | 12/1952 | Eaton | 198/525 X |
| 2,634,117 | 4/1953 | Bloxham | 34/217 X |
| 2,788,732 | 4/1957 | Templeton | 426/444 X |
| 2,833,652 | 5/1958 | Naatz | 426/444 |
| 3,450,440 | 6/1969 | Hagenah | 198/525 X |
| 3,513,961 | 5/1970 | Franklin | 198/525 X |
| 3,573,938 | 4/1971 | Kelly et al. | 99/470 X |
| 3,695,165 | 10/1972 | Sienkiewicz | 99/470 X |
| 3,942,426 | 3/1976 | Binks et al. | 99/473 |
| 3,961,569 | 6/1976 | Kenyon et al. | 99/470 X |

Primary Examiner—Harvey C. Hornsby
Assistant Examiner—John M. Jillions
Attorney, Agent, or Firm—William Anthony Drucker

[57] ABSTRACT

Apparatus for cooling hops comprises a cooling chamber, charging means for hops to be cooled at one end of the chamber, discharging means for cooled hops at the other end of the chamber, a gas-permeable surface within the chamber for supporting a bed of hops, means for conveying hops deposited on said surface by said charging means towards said discharging means, means for maintaining a bed of hops of predetermined depth on said surface and means for passing cold gas through the bed of hops on said surface. In order to reduce adverse effects on the cooling conditions, both the charging and discharging means are constructed as air locks. The gas-permeable surface and the means for maintaining the bed of hops at a predetermined depth are preferably both endless mesh screen conveyor belts. Means for cooling and recycling gas may be associated with the cooling chamber and the whole apparatus may be integrated in a continuous lupulin recovery process.

8 Claims, 3 Drawing Figures

APPARATUS FOR COOLING HOPS

FIELD OF THE INVENTION

This invention relates to apparatus for cooling hops.

PRIOR ART

In one method of recovering lupulin from hop cones, the lupulin granules are mechanically separated from the hops. In this context it has already been described in U.S. Pat. No. 2,833,652 that separation is greatly facilitated if the lupulin i.e. the hop, is previously deep frozen to a temperature of from $-9°$ to $-62°$ C. In German Pat. No. 1,234,656 it has been proposed to cool the previously disintegrated bracteoles of the hop cones in a conventional cooling chamber by exposing the hops to a stream of air or of an inert gas which is at a suitable temperature.

However, among other factors, opening the cooling chamber for charging and discharging the hop cones has a pronounced and abrupt adverse effect on the conditions of cooling. By conducting the stream of cold gas over the hop cones, only a fairly thin layer of hops can be cooled within a time that is economically acceptable. Apart from this, any non-uniformity in the thickness of the layer of hops charged into the cooling chamber has the effect that the desired low temperature is not reached everywhere in the layer, or that the cooling time must be extended.

SUMMARY OF THE INVENTION

It is an object of the present invention to provide apparatus for cooling hops in which a relatively deep bed of hops can be cooled with the expenditure of a predictable minimum amount of energy.

According to the present invention there is provided apparatus for cooling hops, comprising a cooling chamber, charging means for hops to be cooled at one end of said chamber, discharging means for cooled hops at the opposite end of said chamber, said charging and discharging means each being in the form of an air lock, a gas-permeable surface within the interior of said chamber for supporting a bed of hops, means for conveying hops deposited on said surface by said charging means towards said discharging means, means for maintaining a bed of hops of predetermined depth on said surface, and means for passing cold gas through the bed of hops on said surface.

With a view to providing a supporting surface that is both simple and particularly suitable for the contemplated purpose it is preferred that it should have the form of a screen or mesh. If the size of the mesh openings is arranged to correspond to the size of the lupulin granules so that the latter can just pass through, this will have the advantage that some of the lupulin granules which become detached from the hops during cooling can be screened off at once. On the other hand, if the size of the mesh is less, loose lupulin granules will be conveyed to the discharging means together with the cones.

With a view to providing continuous cooling for the hops, for instance should the apparatus be intended for integration in a continuous lupulin recovery process, then it is advantageous to construct the gas-permeable supporting surface, in the form of a conveyor. Such a conveyor could be a shaker trough which assists the screening of any lupulin granules that may have already become detached during the cooling process. Alternatively the surface may be constituted by an endless travelling conveyor.

In order to maintain the desired depth of the bed of hops a suitable arrangement consists in the provision of at least one levelling plate above the supporting surface, and preferably several levelling plates distributed along the entire length of the surface.

If the stream of cold gas leaving the cooling chamber is cooled by cooling equipment and then recycled into the cooling chamber, then it is advisable to filter the gas prior to its entry into the cooling equipment. In order to provide a preliminary filtering of the cold gas stream and to avoid clogging filters at the entry into the cooling equipment, a particularly suitable arrangement for controlling the depth of the bed of hop cones is a continuous levelling belt which is permeable to the cooling gas stream.

This levelling belt may likewise be a screen or mesh and is preferably an endless travelling screen, the width of which is equal to the width of the gas-permeable surface.

In order to keep the levelling belt and/or the gas-permeable surface clean, devices may be provided for stripping residual pieces of hop therefrom.

Furthermore, a uniform distribution of the hop cones on the supporting surface can be obtained by providing adjacent the charging lock and extending across the width of the gas-permeable surface a distributing roller which may be fitted with spikes, or with transversely feeding flights, i.e. vanes projecting radially from the roller and inclined with respect to a plane normal to the axis of rotation of the roller so as to push material along in the axial direction.

Moreover, perforated distributor plates extending at least across the full width and part of the length of the gas-permeable surface may be provided for guiding the cold gas entering from below into the vertical and for deflecting the discharged gas out of the vertical. Limiting the admission of the cold gas to part of the length of the gas-permeable supporting surface has the advantage in a preferred embodiment of the present apparatus that the hop cones which have been deposited to form a bed of predetermined depth on the supporting surface will have already come "to rest" and will not be whirled up even more by the stream of gas. The discharging lock may be constructed in the manner of a filter or it may be fitted with a filter.

Preferably the apparatus is provided underneath the charging lock and/or above the discharging lock with deflector plates or baffles for guiding the hop cones to the supporting surface and from the supporting surface to a cross conveyor and from the latter to the discharging lock.

BRIEF DESCRIPTION OF DRAWINGS

In order to enable the invention to be more readily understood, reference will now be made to the accompanying drawings, which illustrate diagrammatically and by way of example a embodiment thereof, and in which.

DESCRIPTION OF PREFERRED EMBODIMENT

Figure 1:
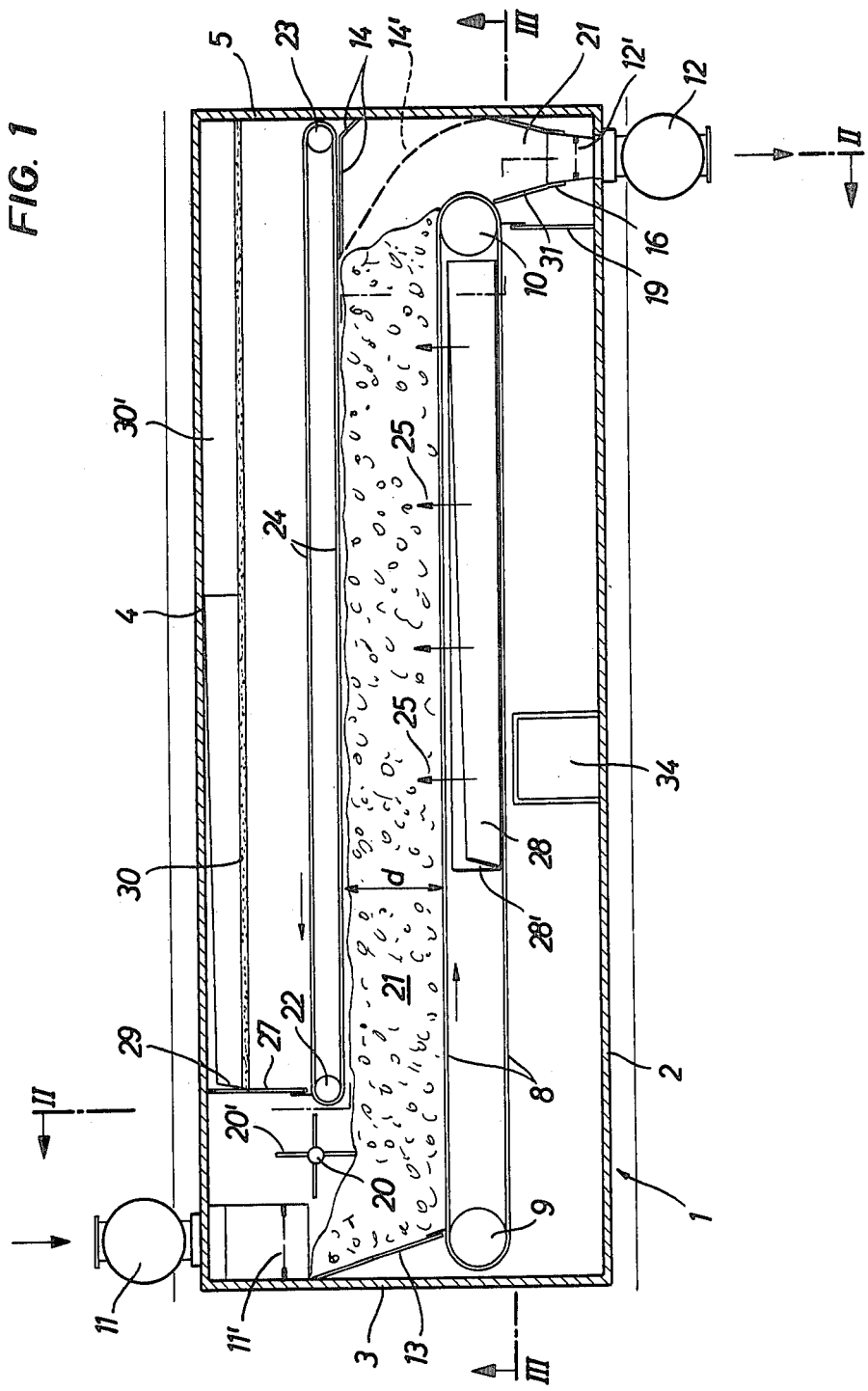
FIG. 1 is a longitudinal section of apparatus for cooling hops.

Referring now to the drawings, there is shown apparatus for cooling hops. The apparatus comprises a cooling chamber 1 having the general geometrical shape of a box with a bottom 2, a back end wall 3, a roof 4, a front end wall 5 and side walls 6 and 7, all of heat insulating construction. An endless conveyor 8 occupying the full width and extending nearly the full length of the cooling chamber 1 runs over driving and return rollers 9 and 10 located near the back and front end walls 3 and 5, the conveyor 8 being a screen having a mesh suitably adapted to the size of the lupulin granules.

For charging the conveyor 8 with hops 21 a charging mechanism 11 resembling an air lock is provided substantially centrally of one end of the roof 4, for instance near the back end wall 3. The air lock type of construction is intended to reduce heat exchange between the interior of the cooling chamber and the ambient atmosphere. The charging mechanism 11 may be provided with an apron 11', such as a fairly stiff plastics film to serve as a closure operable under a weight of hops accumulated thereon. Instead of a plastics apron, double wall sections extending across the path of entry of the charge could be provided, to respond to the incoming charge by one wall section of a plurality of consecutive wall sections being tilted or displaced in such a way that each at a time functions as an apron. Located below the charging mechanism 11 are deflector plates 13 and a spiked roller 20, the deflector plates 13 principally serving for stripping or clearing residual pieces of hop from the conveyor 8 as well as for ensuring that the entire cooled material will drop through to the surface 8.

The spiked roller 20 is armed with spikes 20' or the like projecting radially at angular intervals of 90° and distributed in groups along the entire length of the roller. Instead of the illustrated spikes 20', it would also be possible to fit propulsion means in the form of inclined radial vanes to the roller shaft. The propelling radial vanes would be so angled that the hops to be cooled would not only be evenly distributed crosswise of the roller shaft but also propelled in the widthwise direction of the conveyor towards the side walls 6 and 7.

The conveyor 8 conveys the hops 21 to a transverse conveyor in the form of a shaker trough 16 to a discharging opening 12 likewise in the form of an air lock, the shaker trough 16 being driven by a vibrator motor 17. The discharging opening 12 which may also be provided with an apron 12' is substantially identical to the charging mechanism 11 but inverted with respect thereto. The charging and/or discharging locks may alternatively be fitted with screw conveyors. In order to limit the volume of cooled material leaving the discharging opening 12, convergent plates 31 and a baffle 14 are provided, the baffle 14 being located below return roller 23 of a levelling belt 24 which runs round rollers 22 and 23. Instead of the baffle 14 located below the return roller 23, it is possible to provide a concavely curved deflector 14' (shown in broken lines) of which one end located above the return roller 10 could serve as a stripper blade directly adjacent the levelling belt 24, whereas the other end could be attached to the front wall 5 adjoining one of the convergent deflector plates 31.

The hops 21 to be cooled are deposited on the conveyor 8 and are cooled on the way from the charging mechanism 11 to the discharging opening 12 by cooling air which is blown through the conveyor 8 and the hops from below in the direction of arrows 25 — i.e. in upflow. Below the roof 4 this air is extracted in the direction of arrows 26 — i.e. horizontally, by a fan 32, and conveyed through a re-entry chamber 36 to cooling equipment 33 before being re-introduced into the chamber 1 for cooling the hops.

In order to ensure that the air is evenly distributed across the entire width of the conveyor 8, a plane horizontal distributor plate 28, which is slotted or otherwise perforated over substantially all of its area, is provided and forms the top of a cold air admission chamber, the plate 28 extending across the full width and a substantial part of the length of the conveyor 5. The velocity of air flow, and admission temperature of the cold air, the desired end temperature of the hops 21, the depth $d$ of the bed of hops and the retention time of the hops on the conveyor 8 are the factors determining the capacity of the air admission chamber and the size of the plate 28.

For example, for a velocity of flow of the cooling air of from 2 to 4 meters per second, an entry temperature for the cold air of −25° C, a depth $d$ of the deposited bed of 60 cm. and a retention time of the hops 21 in the cooling zone of 15 minutes, a final temperature of the hops of about −12° C. can be attained. The velocity of flow of 2 to 4 meters/sec. is chosen because it is desired to avoid whirling up the hops with the evolution of dust during the cooling process. It is at least partly for this reason that the passage of cooling air is not arranged to begin directly underneath the return roller 22, but considerably later. The end wall 28' of the air entry chamber 28 is therefore much further away from the back wall 3 of the cooling chamber than the return roller 22.

The gas which is blown through the cooling material across the entire width of the conveyor 8 passes through a filter 30 and is deflected, as indicated by the arrows 26, into the horizontal and conducted through a rectangular chamber 30' through a perforated plate 29 into a chamber 32', from here it is drawn into the intake 32" of the fan 32.

The depth $d$ of the bed of hops 21 on the conveyor 8 is controlled by the levelling belt 24 which runs over the return rollers 22 and 23 above and parallel to the conveyor 8. The levelling belt 24 is also a wire mesh having openings which are slightly smaller than the lupulin granules. The width of the belt 24 is the same as that of the conveyor 8 and its length is also nearly the same as that of conveyor 8. However, it is slightly offset from the conveyor towards one end in such manner that the back end return roller 22 is located directly following the spiked roller 20 and the front end return roller 23 is located adjacent the front end wall 5.

The levelling belt 24 also functions as a preliminary filter for the cooling air leaving the bed of hops 21. The filter 30 which extends over the entire width and length of the belt 24 prevents the fan 32 from becoming clogged with pieces of bracteole, pedicels and the like still attached to the hops. The filter 30 can be readily cleaned by reversing the direction of air flow.

As already mentioned, the levelling belt 24 extends beyond the end of the conveyor 8. Any residual pieces of hop adhering to the levelling belt 24 can thus drop off this belt 24 into the chamber beneath so that the levelling belt is automatically kept clean and permeable to the cooling gas.

In the indicated modified form of construction of the apparatus the plate 14', which keeps the levelling belt 24 clean, besides deflecting the hops 21 into the shaker trough 16 underneath ensures firstly that residual pieces of hop adhering to the levelling belt 24 will be cleared off and secondly that a space from which the cooling air is excluded will be formed between the deflector plate 14' and the levelling belt 24, which has the effect of assisting residual portions of hop still clinging to the belt to drop off by gravity. Any such hop residues collecting at the back of the deflector plate 14' can then be removed through a door (not shown) in the end wall 5.

Figure 2:
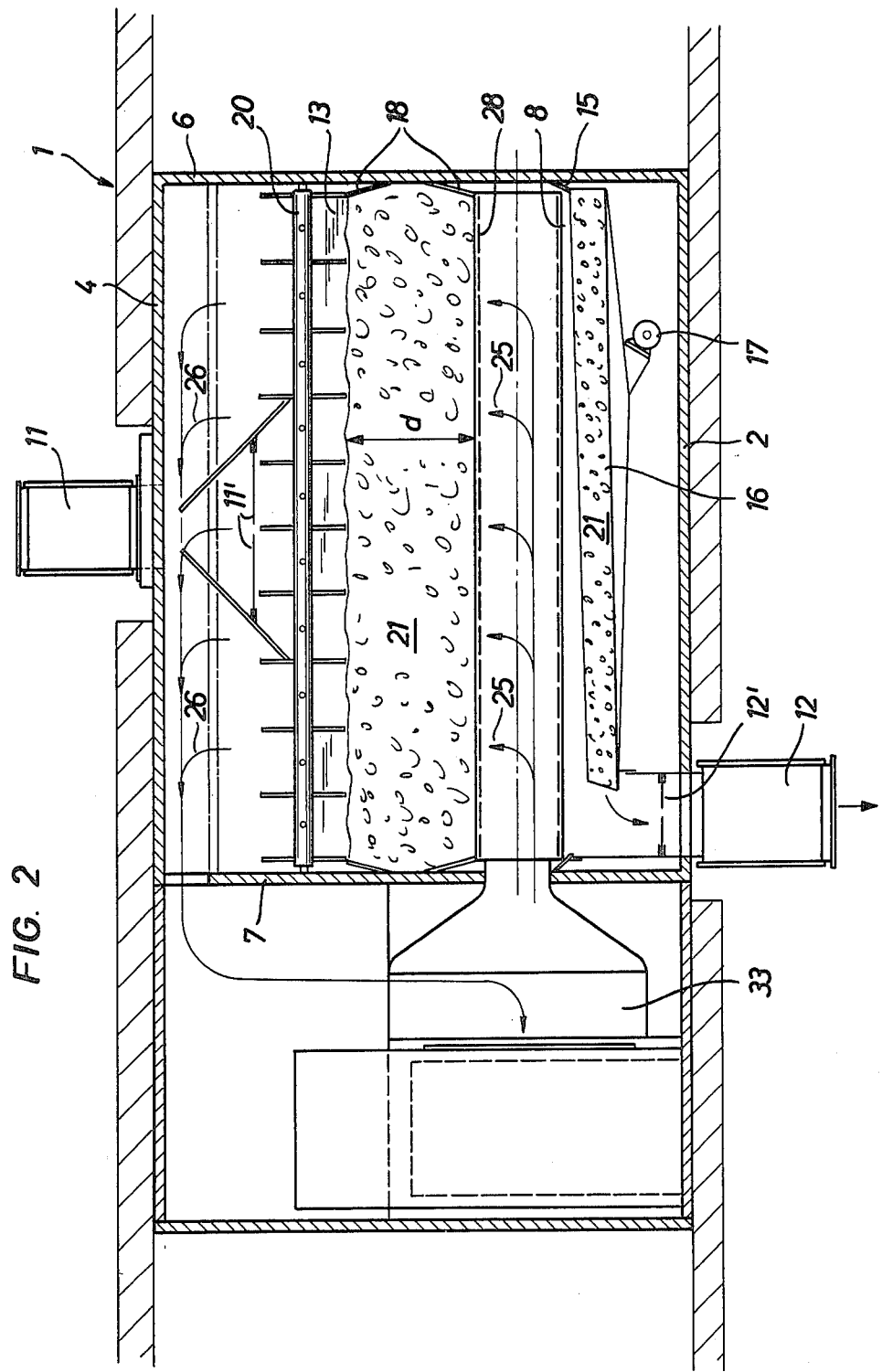
FIG. 2 is a section of the apparatus taken on the line II—II in FIG. 1.
Figure 3:
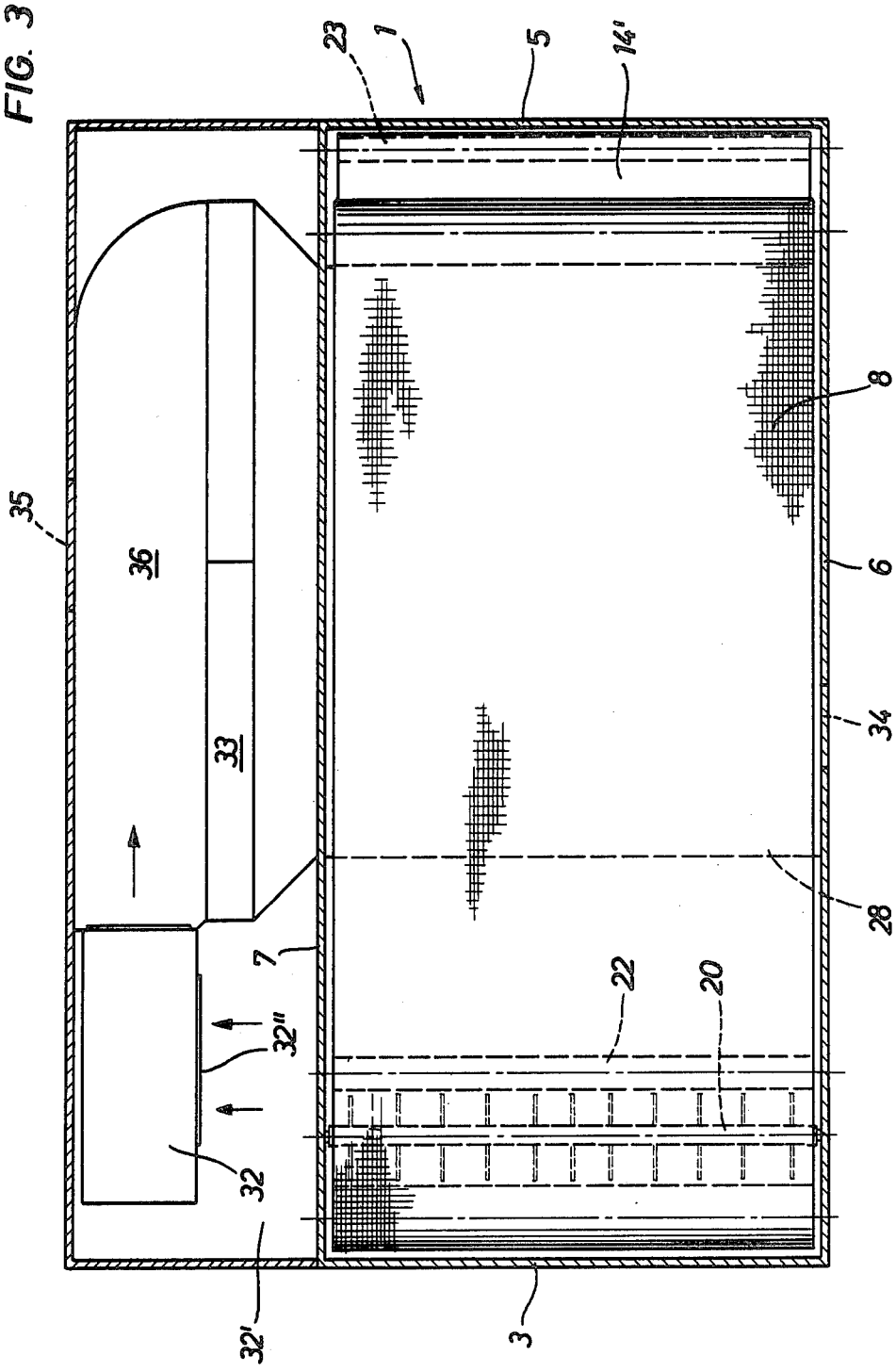
FIG. 3 is a section of the apparatus taken on the line III—III in FIG. 1.

Apart from the above mentioned deflector plates, retaining plates 18 (FIG. 2) are provided at the side walls 6 and 7. The space between the levelling belt 24 and the filter 30 is closed by a rear wall 27 which may be fitted at its bottom edge with another stripper plate for the removal of residual pieces of hop.

Vertical upflow of the cooling air, with due regard to the very slow velocity of flow of the cooling air of for instance 2 to 4 meters/sec., is particularly favorable merely because air flow in this direction ensures that to some extent residual pieces of hop which have got caught in the mesh of the conveyor wire will then be at least more readily loosened.

Nevertheless, a reversed direction of flow of the cooling air, i.e. vertically downward, would be quite feasible. However, in such a case means for collecting lupulin granules should preferably be provided underneath the conveyor 8. The cooling air might even be conducted in some other way, for instance obliquely from above towards the conveyor 8, in which case air nozzles or air outlet plates would be provided above the conveyor 8 in the side walls 6 and 7.

An entry hatch 34 and a door 35 give access to the interior of the cooling chamber 1.

We claim:

1. Apparatus, for continuously cooling hops, comprising:
   (i) a cooling chamber having an inlet opening adjacent to a first endwall thereof and an outlet opening adjacent to a second endwall thereof
   (ii) an air lock charging means disposed at said first endwall of said chamber substantially centrally of one end of the chamber roof for charging hops into said chamber, said airlock charging means having a closure openable under the weight of hops accumulated thereon
   (iii) an air lock discharging means disposed at said second endwall in the bottom of said chamber for discharging cooled hops therefrom and having a closure openable under the weight of hops accumulated thereon
   (iv) a rotatable hop-distributing roller disposed in said cooling chamber adjacent to said charging means and above said conveyor belt, said roller extending transversely to the direction of conveying movement of said conveyor belt, said roller being adapted to shift hops axially for distributing charged hops evenly on said conveyor belt
   (v) a driven gas-permeable mesh screen endless conveyor belt, having openings slightly smaller than lupulin granules, disposed substantially horizontally in said cooling chamber and extending substantially from said first endwall to said air lock discharging means and having a portion disposed to receive hops from said charging means to form a bed of hops on said conveyor belt
   (vi) a second driven endless belt, having openings smaller than lupulin granules, disposed in said cooling chamber above said conveyor belt and parallel thereto and extending substantially from said air lock charging means to said second endwall for engaging said hops thereon to maintain said bed of hops at a predetermined height on said conveyor belt
   (vii) means in said cooling chamber for directing a flow of cooling gas through said bed of hops on said conveyor belt, and for collecting said cooling gas after passage through said bed of hops, and
   (viii) means for receiving said collected gas, re-cooling it, and passing it to said gas directing means.

2. Apparatus, as claimed in claim 1, further comprising stripper means disposed in said cooling chamber adjacent to said conveyor belt for detaching residual pieces of hop from said conveyor belt.

3. Apparatus, as claimed in claim 1, wherein said roller is a spiked roller.

4. Apparatus, as claimed in claim 1, further comprising a perforated plate disposed in said cooling chamber below said conveyor belt and in the path of said flow of cooling gas, said perforated plate extending at least across the full width of said conveyor belt and part of the length of said conveyor belt, for distribution of said cooling gas flow evenly through said conveyor belt and the bed of hops thereon.

5. Apparatus, as claimed in claim 1, wherein said means for collecting cooled gas includes filter means for said cooling gas after passage through said bed of hops.

6. Apparatus, as claimed in claim 1, further comprising deflector means disposed in said cooling chamber below said charging means and adjacent to said conveyor belt for deflecting charged hops onto said conveyor belt.

7. Apparatus, as claimed in claim 1, further comprising deflector means disposed in said cooling chamber above said discharging means and adjacent to said conveyor belt for deflecting hops, passing from said conveyor belt, into said discharging means.

8. Apparatus, as claimed in claim 1, further comprising a shaker trough conveyor disposed in said cooling chamber adjacent said conveyor belt for receiving hops from said conveyor belt and conveying them to said discharging means.

* * * * *